United States Patent
Wu et al.

(10) Patent No.: US 12,504,636 B2
(45) Date of Patent: Dec. 23, 2025

(54) INTERPUPILLARY DISTANCE ADJUSTMENT MODULE AND HEAD MOUNTED ELECTRONIC DEVICE

(71) Applicant: NEWMAX TECHNOLOGY CO., LTD., Taichung (TW)

(72) Inventors: Chen-Chung Wu, Taichung (TW); Yung-Fu Liang, Taichung (TW)

(73) Assignee: NEWMAX TECHNOLOGY CO., LTD., Taichung (TW)

(*) Notice: Subject to any disclaimer, the term of this patent is extended or adjusted under 35 U.S.C. 154(b) by 339 days.

(21) Appl. No.: 18/238,207

(22) Filed: Aug. 25, 2023

(65) Prior Publication Data

US 2025/0004281 A1 Jan. 2, 2025

(30) Foreign Application Priority Data

Jun. 29, 2023 (TW) .................................. 112124325

(51) Int. Cl.
G02B 27/01 (2006.01)
(52) U.S. Cl.
CPC .. *G02B 27/0176* (2013.01); *G02B 2027/0154* (2013.01); *G02B 2027/0181* (2013.01)
(58) Field of Classification Search
CPC ........ G02B 27/0176; G02B 2027/0154; G02B 2027/0181; G02B 27/0172
USPC .......................................................... 359/630
See application file for complete search history.

(56) References Cited

U.S. PATENT DOCUMENTS

| | | | |
|---|---|---|---|
| 2019/0285894 A1* | 9/2019 | Tian | G02B 27/0172 |
| 2024/0053578 A1* | 2/2024 | Yang | G02B 27/01 |
| 2024/0329351 A1* | 10/2024 | Lin | G02B 27/0176 |
| 2024/0361570 A1* | 10/2024 | Xu | G02B 27/0093 |
| 2024/0389247 A1* | 11/2024 | Chintapatla | H05K 7/14 |
| 2024/0411143 A1* | 12/2024 | Yan | G02B 27/0172 |

FOREIGN PATENT DOCUMENTS

CN 214151251 U * 9/2021

* cited by examiner

*Primary Examiner* — Stephone B Allen
*Assistant Examiner* — Boutsikaris Leonidas
(74) *Attorney, Agent, or Firm* — Juan Carlos A. Marquez; Marquez IP Law Office, PLLC

(57) ABSTRACT

An interpupillary distance adjustment module includes: a first optical module base including a first slider and a first linkage point; a second optical module base including a second slider and a second linkage point; a linkage mechanism including a linkage rod, a third point and a fourth linkage point; and a base including a first groove, a second groove and a shaft, wherein the first and second grooves are parallel to each other and define a groove direction; wherein when a toggle switch rotates the linkage rod, moves the first optical module base, or moves the second optical module base, the third and fourth linkage points and the first and second linkage points are simultaneously linked and moved, and then the first and second optical module bases are controlled to be equidistantly close to or far away from each other in the groove direction.

20 Claims, 10 Drawing Sheets

INTERPUPILLARY DISTANCE ADJUSTMENT MODULE AND HEAD MOUNTED ELECTRONIC DEVICE

This application claims the benefit of Taiwan Patent Application No. 112124325, filed on Jun. 29, 2023, which is hereby incorporated by reference for all purposes as if fully set forth herein.

BACKGROUND

Technical Field

The present disclosure relates to an interpupillary distance adjustment module, in particular to a head mounted electronic device having an interpupillary distance adjustment module.

Related Art

Virtual Reality (VR) technology is a computer simulation system capable of creating and experiencing a virtual world and utilizing a computer for generating an interactive analogous environment of the multi-source information fusion to make users immersed in the interactive environment. With constant development of the technology, VR technology is increasingly applied to industries and fields such as medicine, entertainment, industrial simulation, aerospace and education.

Augmented Reality (AR) technology is to use a camera to capture real images and combine them with some recognition and positioning technology, so that the real images on the screen can be augmented with virtual objects generated by the computer, whereby the user can see coexisted contents in the real world and the virtual world at the same time.

As one of the important devices for realizing the virtual reality technology and the augmented reality technology, a head mounted electronic device is gradually popularized in daily life. The head mounted electronic devices can expand the degree of scientific 3D visualization, and enhance the interaction performance between the user and the computer. With the application of virtual reality technology and augmented reality technology in many fields, people pay more attention to the head mounted electronic devices. In order to make the relevant head mounted electronic devices, such as wearable virtual reality (VR)/augmented reality (AR) glasses adaptable to different age groups, more comfortable use experience must be achieved.

Interpupillary distance (IPD) can be described as the physical distance between the eyes or the width of the eyes. Most head mounted electronic devices have optical modules (including lenses and displays). If the centers of the user's eyes are not aligned with the optical axis of the optical modules, the best definition and field of view cannot be achieved.

Thus, the interpupillary distance adjustment module and the head mounted electronic device need to be provided for solving previous problems.

SUMMARY

An objective of the present disclosure is to provide an interpupillary distance adjustment module can adjust the interpupillary distance or the width of the eyes by the linkage and movement between the linkage rod and the two optical module bases.

To achieve the above objective, the present disclosure provides an interpupillary distance adjustment module comprising: a first optical module base comprising a first body, a first slider and a first linkage point, wherein the first slider and the first linkage point are located on a bottom surface and a side surface of the first body respectively; a second optical module base comprising a second slider and a second linkage point, wherein the second slider and the second linkage point are located on a bottom surface and a side surface of the second body respectively; a linkage mechanism comprising a linkage rod, a third point and a fourth linkage point, wherein the linkage rod has a rotation point, the third and the fourth linkage points are symmetrically disposed at both ends of the rotation point of the linkage rod, and are mechanically connected to the first and second linkage points respectively; and a base supporting the first and second optical module base and comprising at least one first groove, at least one second groove and a shaft, wherein the first and second grooves are parallel to each other and define a first groove direction, the rotation point of the linkage rod is pivotally connected to the shaft, and the first and second sliders are disposed in the first and second grooves respectively and move in the first groove direction; wherein at least one of the first optical module base, the second optical module base and the linkage rod is provided with a toggle switch, whereby when the toggle switch rotates the linkage rod, moves the first optical module base, or moves the second optical module base, the third and fourth linkage points and the first and second linkage points are simultaneously linked and moved, and then the first and second optical module bases are controlled to be equidistantly close to or far away from each other in the first groove direction.

The present disclosure further provides a head mounted electronic device, comprising: a shell; the above-mentioned interpupillary adjustment module of the present disclosure disposed in the shell, wherein the toggle switch is exposed outside the shell; and a controller disposed in the shell.

According to the head mounted electronic device of the present disclosure, the interpupillary distance adjustment module of the present disclosure can adjust the interpupillary distance or the width of the eyes by the linkage and movement between the linkage rod and the two optical module bases, for example the distance is adjusted to be between 50 and 80 mm. When the user sets the correct interpupillary distance or eye width, the image quality of the virtual reality (VR) and the augmented reality (AR) can be maximally increased. When the user looks especially through the optical axes of the two optical modules, the best definition and field of view can be achieved.

DETAILED DESCRIPTION

To make the foregoing objectives, characteristics and features of the present disclosure more comprehensible, preferred embodiments of the present disclosure are described in detail below with reference to the accompanying drawings.

Figure 1:
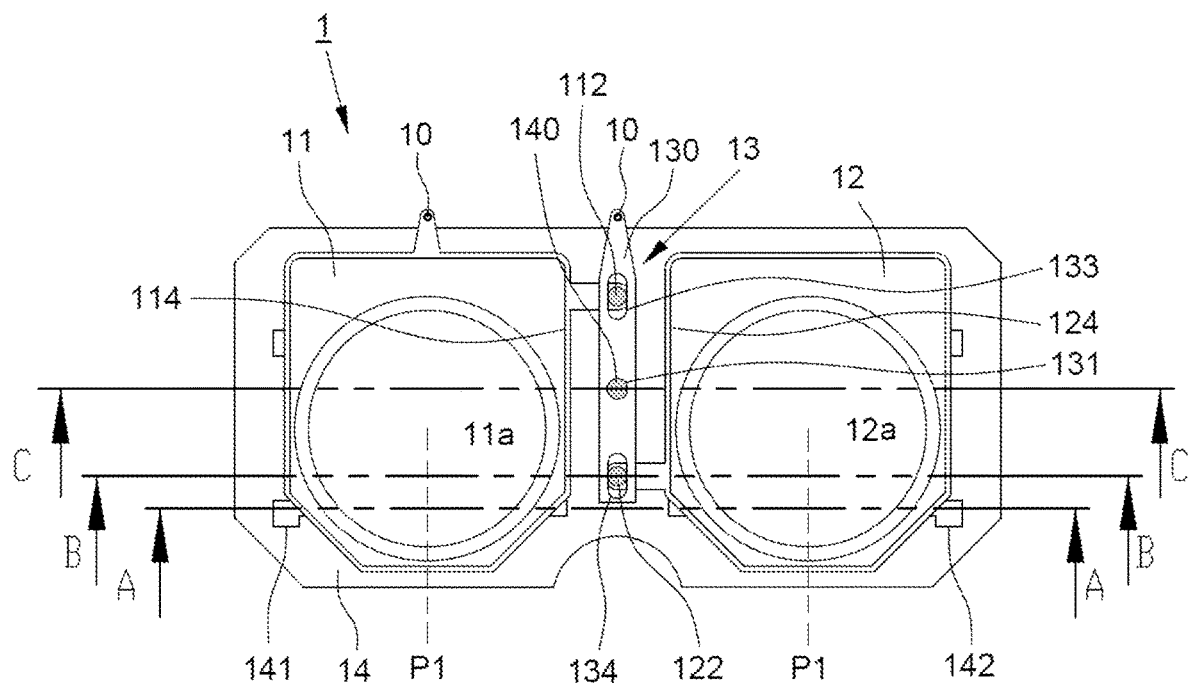
FIG. 1 is schematic top view of an interpupillary distance adjustment module according to an embodiment of the present disclosure, showing that first and second optical modules are located at the first position P1.
Figure 2:
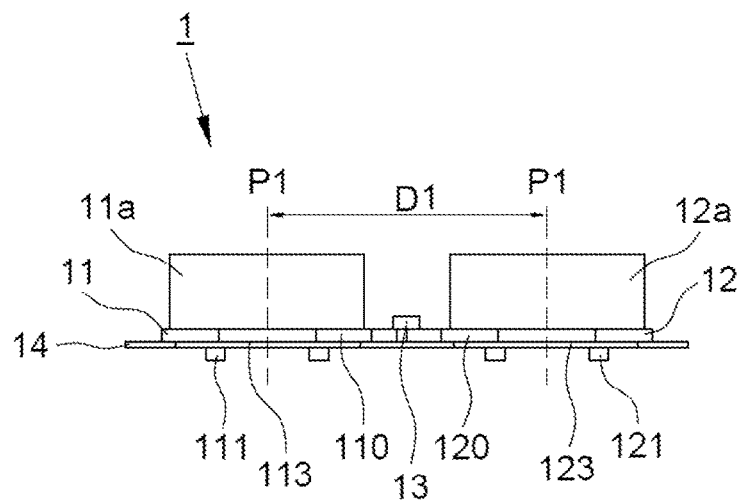
FIG. 2 is schematic side view of an interpupillary distance adjustment module according to an embodiment of the present disclosure, showing that first and second optical modules are located at the first position P1.
Figure 3:
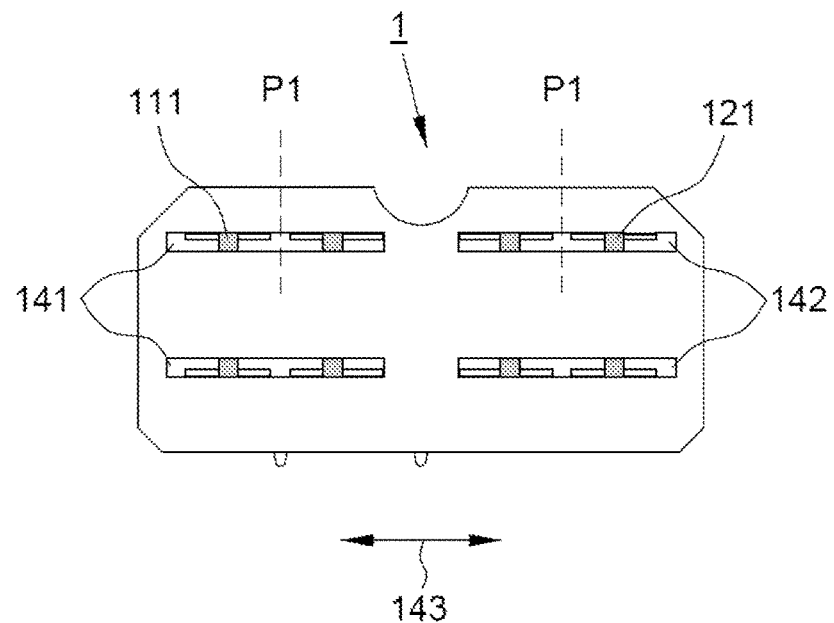
FIG. 3 is schematic bottom view of an interpupillary distance adjustment module according to an embodiment of the present disclosure, showing that first and second optical modules are located at the first position P1.
Figure 4:
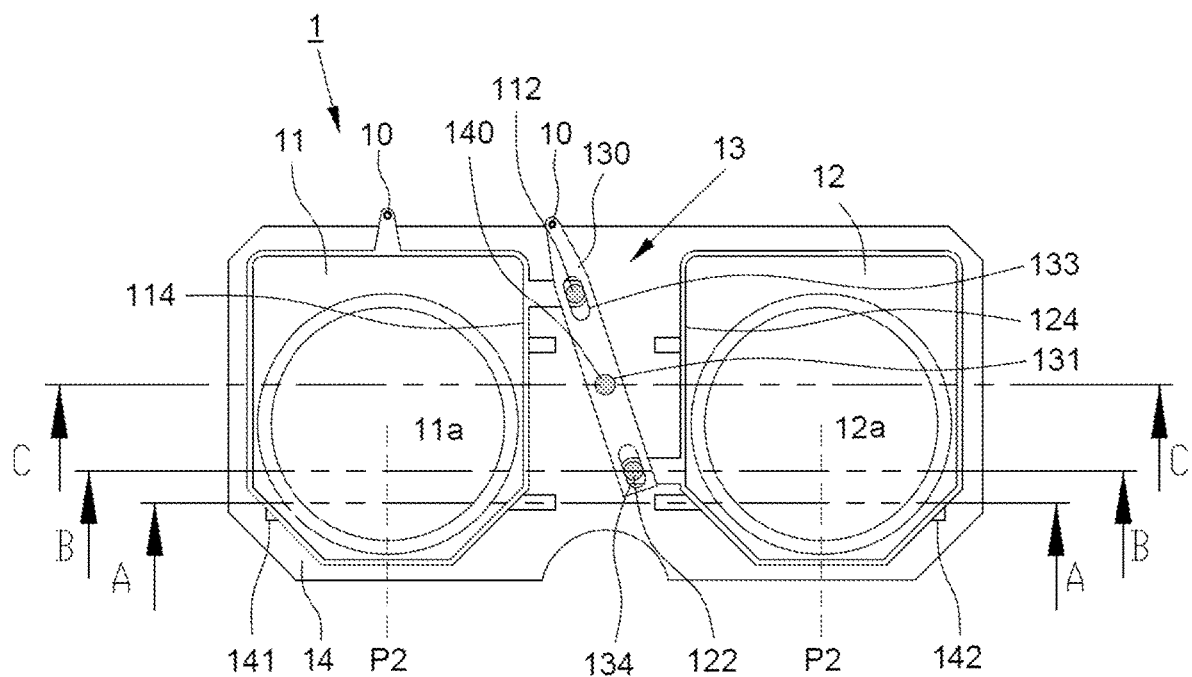
FIG. 4 is schematic top view of an interpupillary distance adjustment module according to an embodiment of the present disclosure, showing that first and second optical modules are located at the second position P2.
Figure 5:
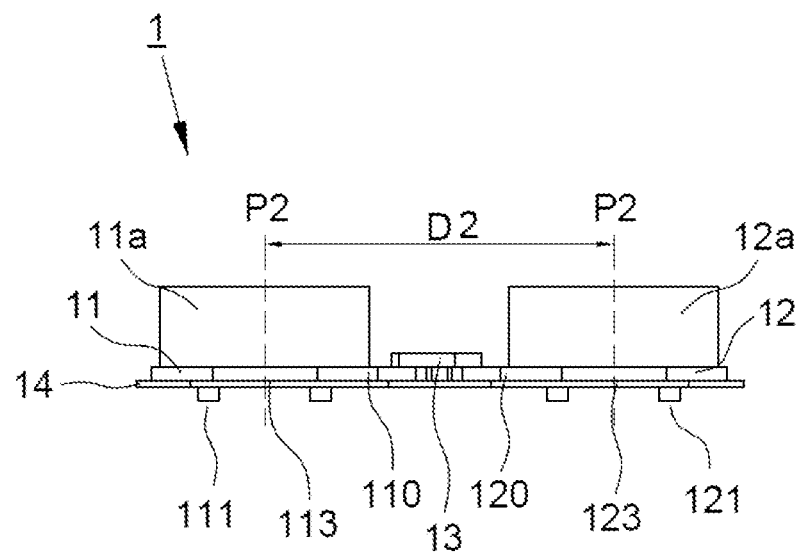
FIG. 5 is schematic side view of an interpupillary distance adjustment module according to an embodiment of the present disclosure, showing that first and second optical modules are located at the second position P2.
Figure 6:
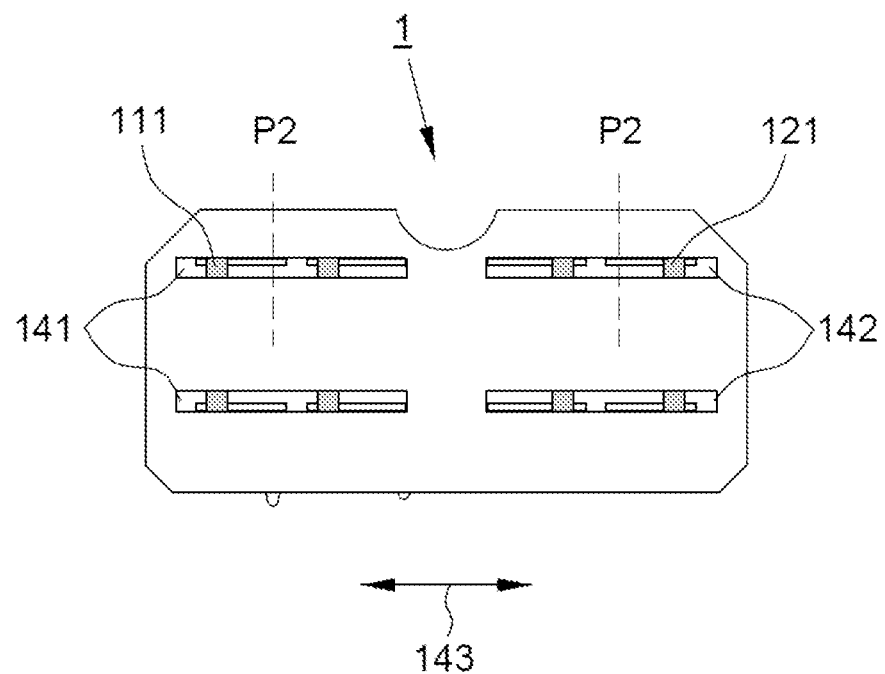
FIG. 6 is schematic bottom view of an interpupillary distance adjustment module according to an embodiment of the present disclosure, showing that first and second optical modules are located at the second position P2.

FIG. 1 to FIG. 3 are schematic top view, side view and bottom view of an interpupillary distance adjustment module according to an embodiment of the present disclosure, showing that first and second optical modules are located at the first position P1. FIG. 4 to FIG. 6 are schematic top view, side view and bottom view of an interpupillary distance adjustment module according to an embodiment of the present disclosure, showing that first and second optical modules are located at the second position P2. Please refer to FIG. 1 to FIG. 6, the interpupillary distance adjustment module 1 includes: a first optical module base 11, a second optical module base 12, a linkage mechanism 13 and a base 14.

Figure 7:
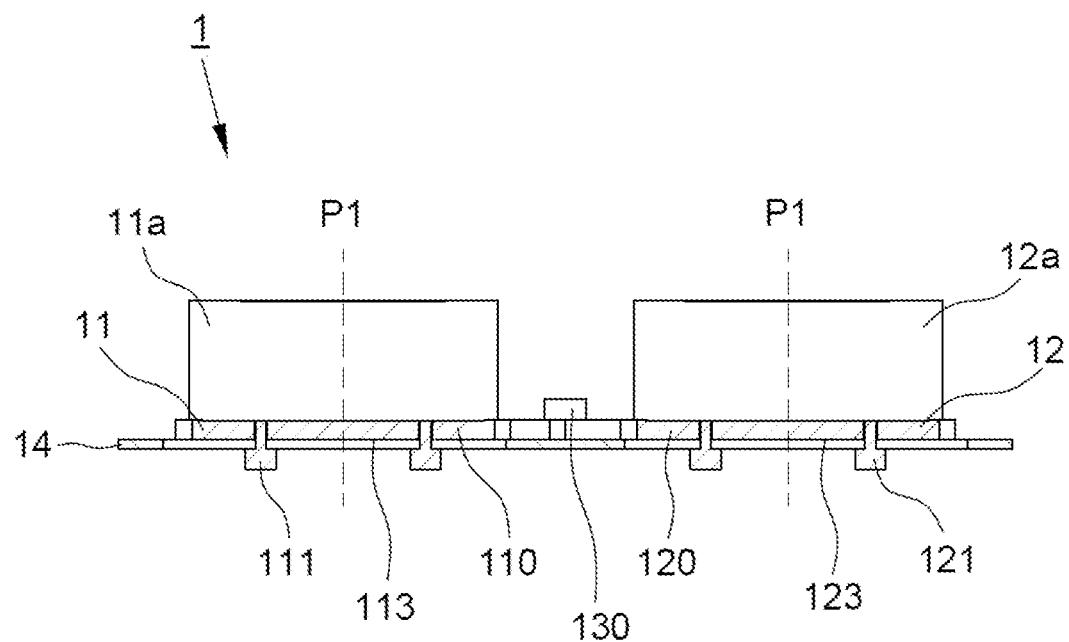
FIG. 7 is a schematic cross-sectional view along the section line A-A of the interpupillary distance adjustment module in FIG. 1 and FIG. 4.
Figure 7:
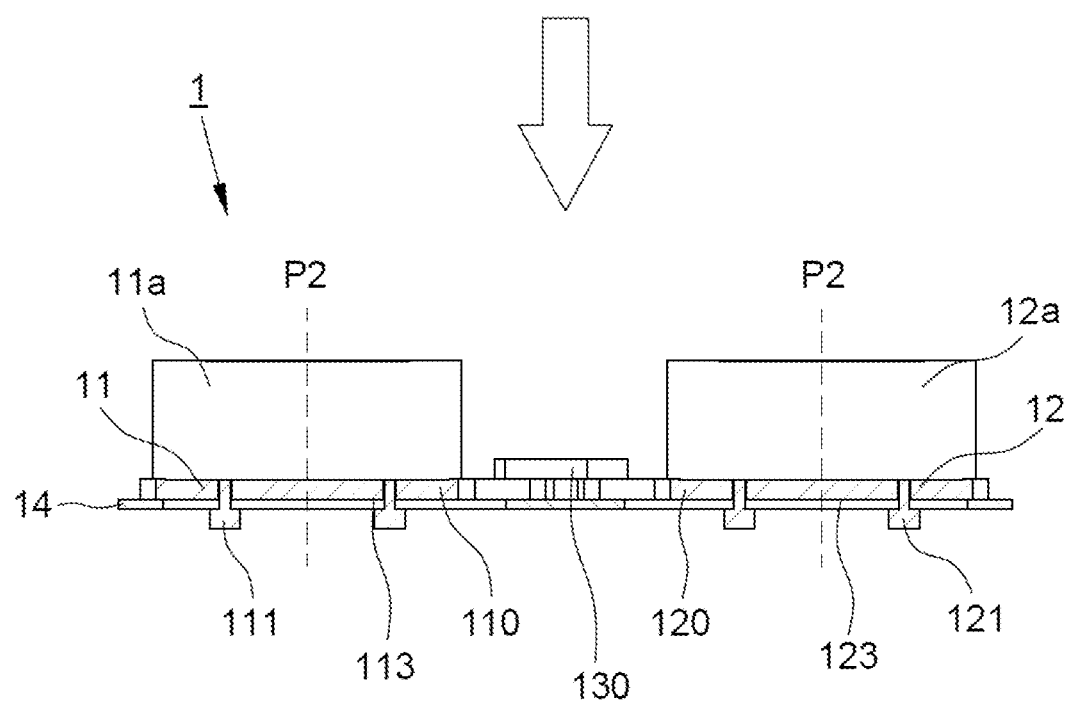

FIG. 7 is a schematic cross-sectional view along the section line A-A of the interpupillary distance adjustment module in FIG. 1 and FIG. 4. Please refer to FIG. 1, FIG. 2, FIG. 4, FIG. 5 and FIG. 7, the first optical module base 11 includes a first body 110, at least one first slider 111 and a first linkage point 112, wherein the first slider 111 and the first linkage point 112 are located on a bottom surface 113 and a side surface 114 of the first body 110 respectively. The second optical module base 12 includes a second body 120, at least a second slider 121 and a second linkage point 122, wherein the second slider 121 and the second linkage point 122 are located on a bottom surface 123 and a side surface 124 of the second body 120 respectively. The interpupillary distance adjustment module 1 further includes: a first optical module 11a and a second optical module 12a, which are positioned and fixed on the first optical module base 11 and the second optical module base 12 respectively. For example, the first and second optical modules 11a, 12a include lenses and displays. The diameters of the first and second optical modules 11a, 12a are about between 50 and 80 mm.

Figure 8:
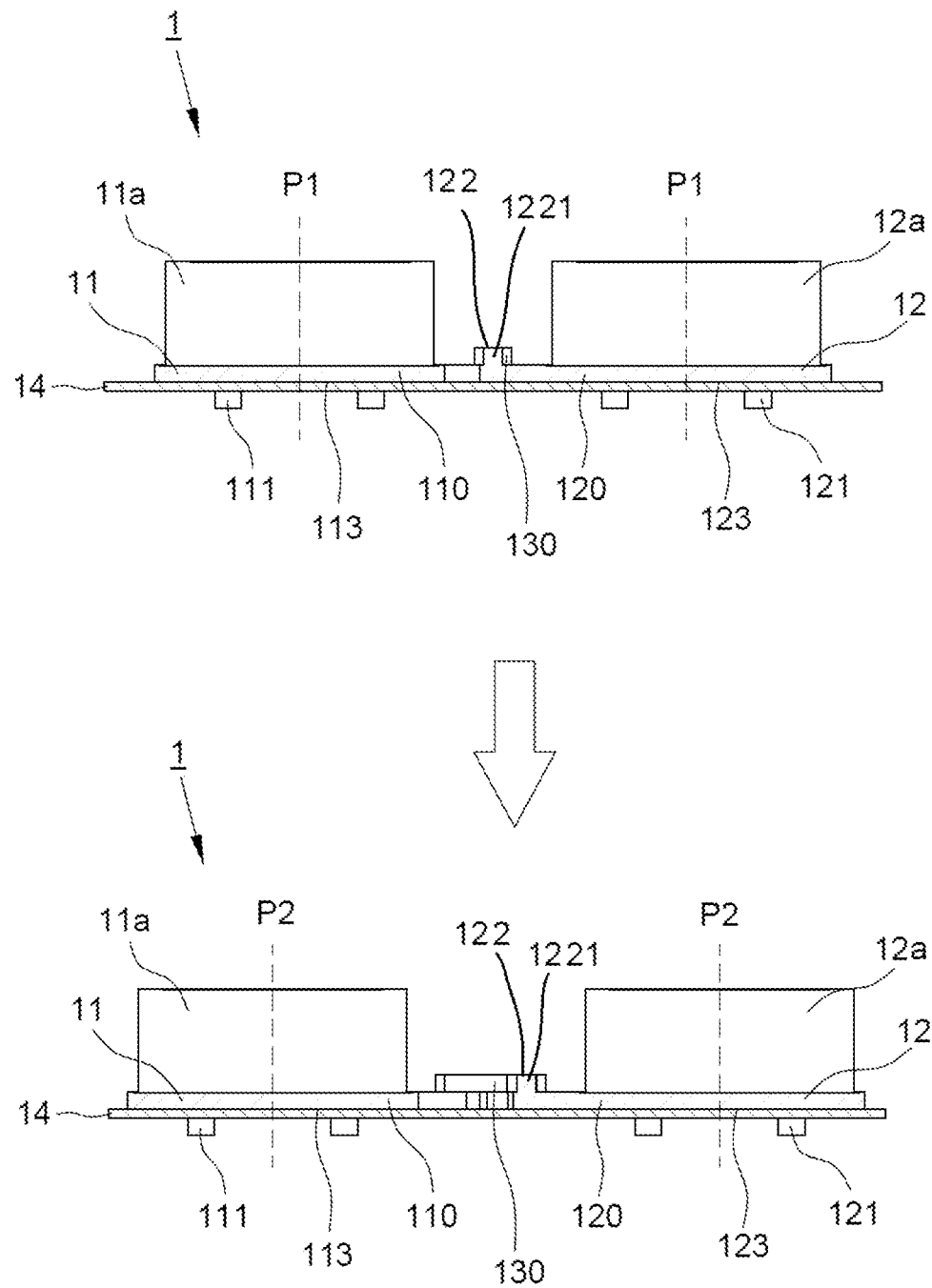
FIG. 8 is a schematic cross-sectional view along the section line B-B of the interpupillary distance adjustment module in FIG. 1 and FIG. 4.
Figure 9:
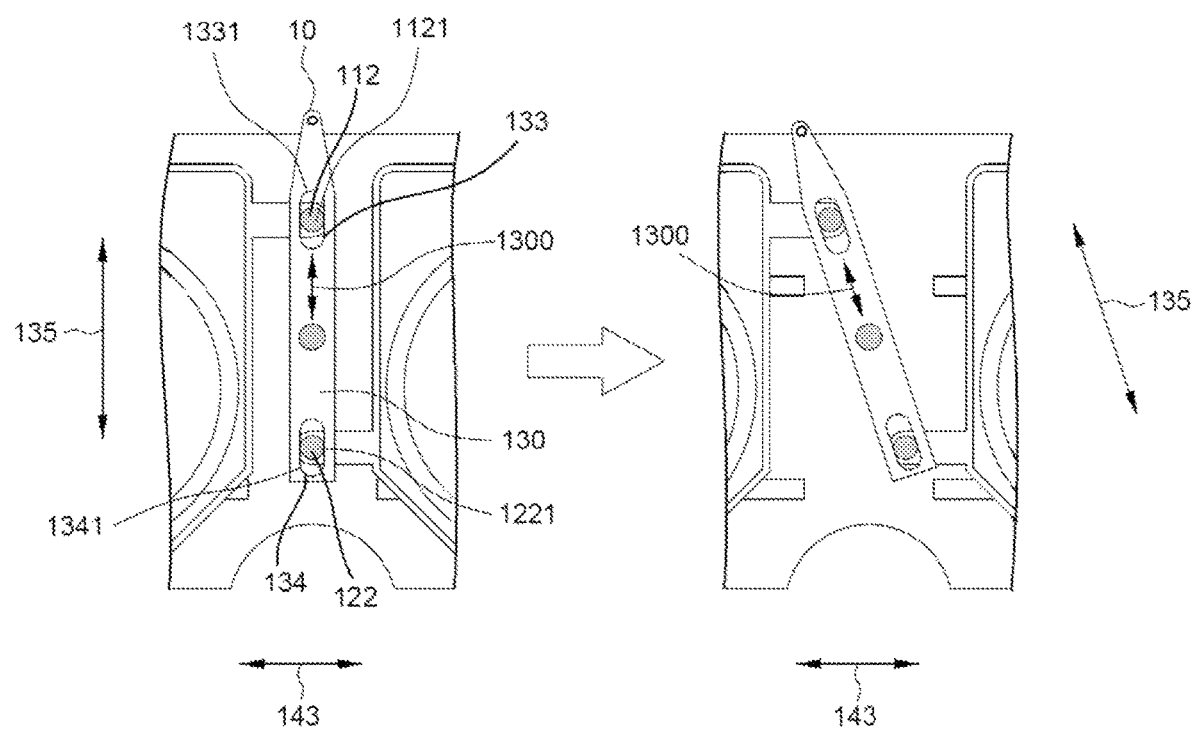
FIG. 9 is a partially enlarged schematic plan view of the interpupillary distance adjustment module in FIG. 1 and FIG. 4.

FIG. 8 is a schematic cross-sectional view along the section line B-B of the interpupillary distance adjustment module in FIG. 1 and FIG. 4. FIG. 9 is a partially enlarged schematic plan view of the interpupillary distance adjustment module in FIG. 1 and FIG. 4. Please refer to FIG. 1, FIG. 4, FIG. 8 and FIG. 9, the linkage mechanism 13 includes a linkage rod 130, a third linkage point 133 and a fourth linkage point 134, wherein the linkage rod 130 has a rotation point 131, the third and the fourth linkage points 133, 134 are symmetrically disposed at both ends of the rotation point 131 of the linkage rod 130, and are mechanically connected to the first and second linkage points 112, 122 respectively. "The third and the fourth linkage points 133, 134 are mechanically connected to the first and second linkage points 112, 122 respectively," which means that the first and second linkage points 112, 122 respectively include first and second cylindrical sliders 1121, 1221, and the third the fourth linkage point 133, 134 respectively comprise first and second elongated grooves 1331, 1341, the first and second cylindrical sliders 1121, 1221 are disposed in the first and second elongated grooves 1331, 1341, and the first and second elongated grooves 1121, 1221 defines a groove direction 135 parallel to an axial direction 1300 of the linkage rod 130. For example, the distance between the rotation point 131 and the first and second elongated grooves 1331, 1341 is about between 10 and 20 mm. The length of the first and second elongated grooves 1331, 1341 is about between 2 and 7 mm.

The first optical module base 11 is provided with a toggle switch 10, the linkage rod 130 is provided with a toggle switch 10, or the second optical module base 12 is also provided with a toggle switch (not shown). When the toggle switch 10 rotates the linkage rod 130, moves the first optical module base 11, or moves the second optical module base 12, the first and second cylindrical sliders 1121, 1221 move not only in the groove direction 143 of the base 14 but also in the groove direction 135 of the linkage rod 130.

Figure 10:
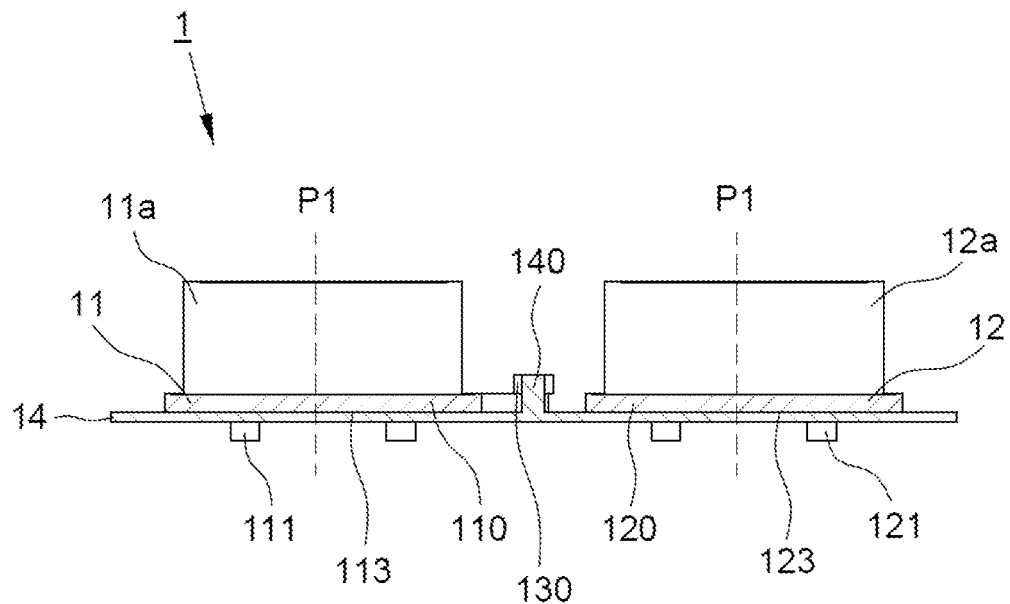
FIG. 10 is a schematic cross-sectional view along the section line C-C of the interpupillary distance adjustment module in FIG. 1 and FIG. 4.
Figure 10:
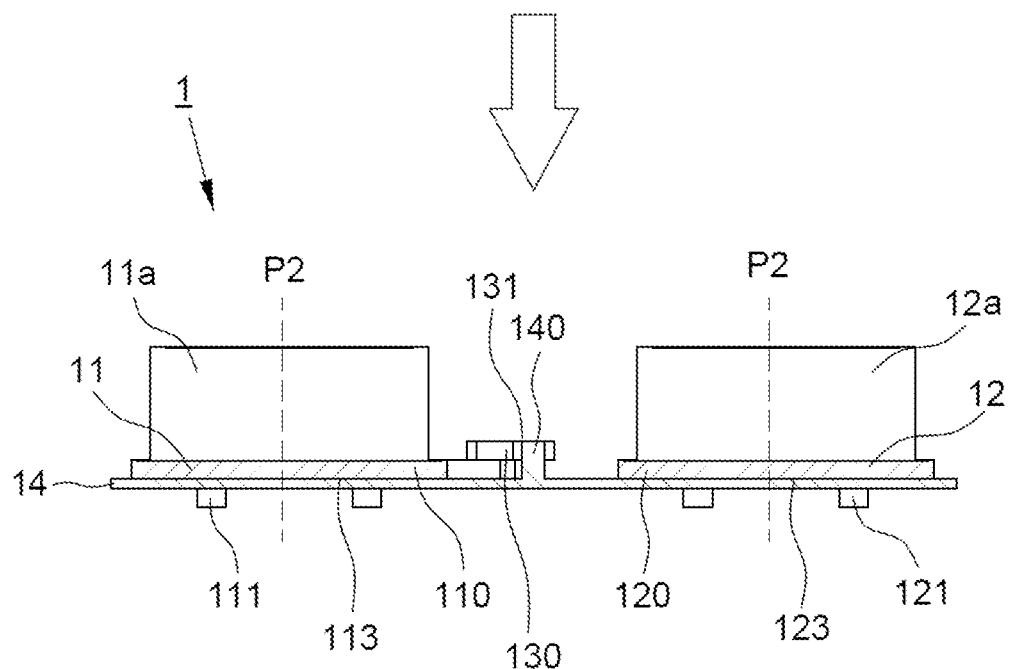

FIG. 10 is a schematic cross-sectional view along the section line C-C of the interpupillary distance adjustment module in FIG. 1 and FIG. 4. Please refer to FIG. 3, FIG. 6 and FIG. 10, the base 14 supports the first and second optical module bases 11, 12, and includes at least one first groove 141, at least one second groove 142 and a shaft 140, wherein the first and second grooves 141, 142 are parallel to each other and define the groove direction 143, the rotation point 131 of the linkage rod 130 is pivotally connected to the shaft 140, the first and second slider 111, 121 are disposed in the first and second grooves 141, 142 respectively and move in the groove direction 143 of the base 14. For example, the length of the first and second grooves 141, 142 is about between 40 and 50 mm.

Please refer to FIG. 1 and FIG. 4 again, when the user rotates the linkage rod 130 by the toggle switch 10, moves the first optical module base 11, or moves the second optical module base 12, the third and fourth linkage points 133, 134 and the first and second linkage points 112, 122 are simultaneously linked and moved, and then the first and second optical module bases 11, 12 are controlled to be equidistantly close to or far away from each other in the groove direction 143, or the first and second optical modules 11a, 12a located on the first and second optical module bases 11, 12 are controlled to be equidistantly close to or far away from each other in the groove direction 143. For example, the first and second optical modules 11a, 12a move from the first position P1 (shown in FIG. 1 to FIG. 3) to the second position P2 (shown in FIG. 4 to FIG. 6), so that the distance between the optical axis of the first optical module 11a and the optical axis of the second optical module 12a is increased from the first distance D1 to the second distance D2, and the first and second optical modules 11a, 12a are equidistantly far away from each other. Preferably, the distance between the optical axis of the first optical module 11a and the optical axis of the second optical module 12a can be adjusted to be about between 50 and 80 mm. In other words, according to the interpupillary distance adjustment module of the present disclosure, the user's interpupillary distance or eye width can be adjusted to be about between 50 and 80 mm.

Figure 11A:
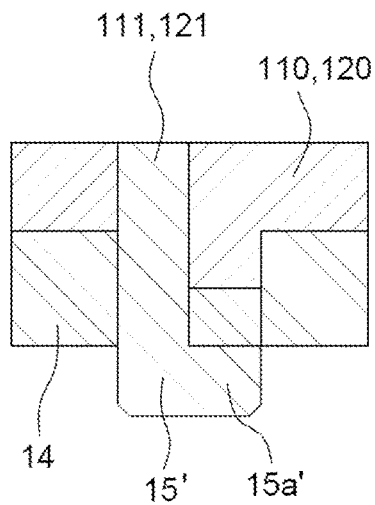
FIG. 11a, FIG. 11b and FIG. 11c are first, second and third schematic cross-sectional views of the first and second sliders of an embodiment of the present disclosure.
Figure 11B:
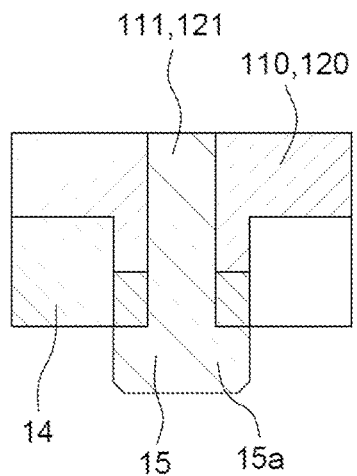
Figure 11C:
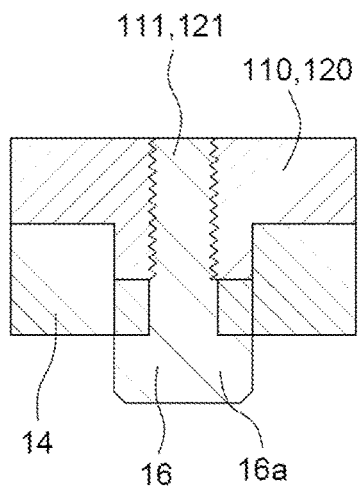

FIG. 11a, FIG. 11b and FIG. 11c are first, second and third schematic cross-sectional views of the first and second sliders of an embodiment of the present disclosure. Please refer to FIG. 11a, FIG. 11b, FIG. 11c and FIG. 7, the first and second sliders 111, 121 are claws 15, 15' or screws 16. When the first and second sliders 111, 121 are claws 15, 15', the claws 15, 15' are integrally formed with the first and second bodies 110, 120 respectively, so that the production of parts can be reduced. When the first and second sliders 111, 121 are screws 16, the screws 16 are respectively locked to the first and second bodies 110, 120, so that the hooked effect can be achieved by a locking manner.

Figure 12:
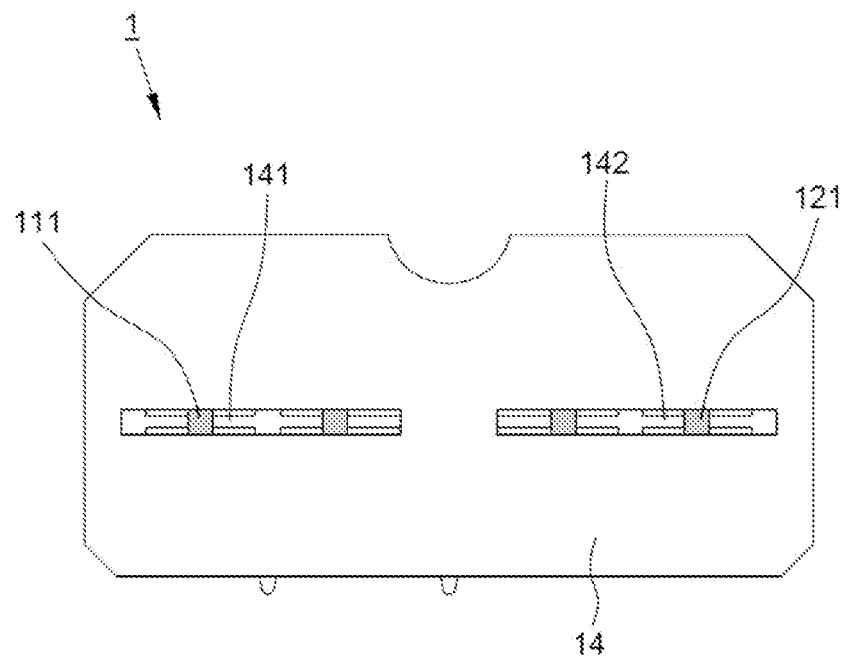
FIG. 12 is a schematic bottom view of the interpupillary distance adjustment module according to another embodiment of the present disclosure.
Figure 13A:
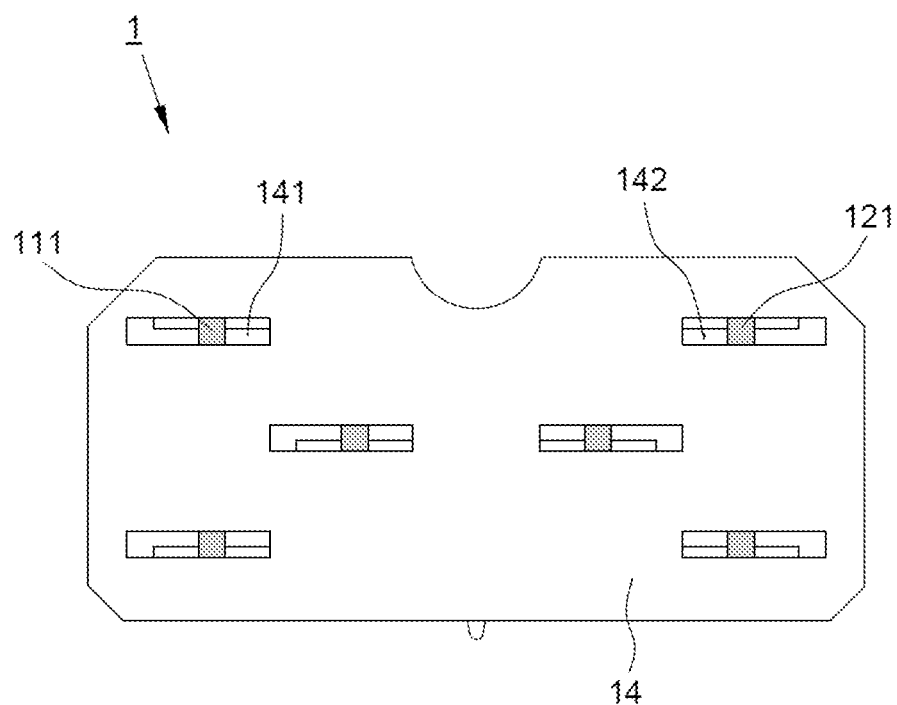
FIG. 13a and FIG. 13b are first and second schematic bottom views of an interpupillary distance adjustment module according to a further embodiment of the present disclosure.
Figure 13B:
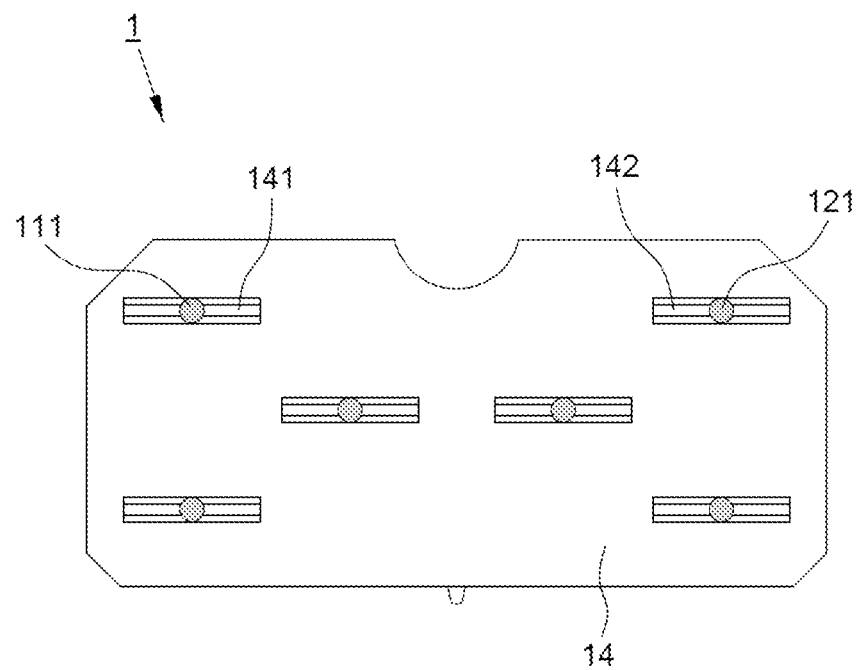

FIG. 12 is a schematic bottom view of the interpupillary distance adjustment module according to another embodiment of the present disclosure. Please refer to FIG. 12, FIG. 11b and FIG. 11c, when the number of the first groove 141 is one and the number of the second groove 142 is one, the first and second sliders 111, 121 respectively comprise an end portion 15a, 16a of a T-shaped section, which are hooked in the first and second grooves 141, 142 respectively. Although the number of the first groove 141 and the number of the second groove 142 are only one respectively, the first and second sliders 111, 121 are hooked in the first and second grooves 141, 142 respectively by the T-shaped section, so the first and second optical module bases 11, 12 can still move smoothly in the groove direction 143 without skewing. Please refer to FIG. 3 and FIG. 11a, FIG. 11b and FIG. 11c again, when the number of the first groove 141 is at least two and the number of the second groove 142 is at least two, the first and second sliders 111, 121 respectively comprise an end portion 15a' of an L-shaped section or an end portion 15a, 16a of a T-shaped section, which are hooked in the first and second grooves 141, 142 respectively. Since the number of the first groove 141 and the number of the second groove 142 are two respectively, the first and second optical module bases 11, 12 can move smoothly in the groove direction 143 without skewing. FIG. 13a and FIG. 13b are first and second schematic bottom views of an interpupillary distance adjustment module according to another embodiment of the present disclosure. Please refer to FIG. 13a and FIG. 13b, when the number of the first groove 141 is at least three and the number of the second groove 142 is at least three, the adjacent two of the first and second grooves 141, 142 are disposed in a staggered arrangement. Since the number of the first groove 141 and the number of the second groove 142 are three respectively, and the adjacent grooves are disposed in a staggered arrangement, the first and second optical module bases 11, 12 can move more smoothly in the groove direction 143. The first and second sliders 111, 121 may respectively include an end portion of an L-shaped section or an end portion of a T-shaped section, which are hooked in the first and second grooves 141, 142 respectively.

Please refer to FIG. 1, FIG. 2 and FIG. 3 again, the assembly method of the interpupillary distance adjustment module of the present disclosure includes the following steps: the first slider 111 of the first optical module base 11 and the second slider 121 of the second optical module base 12 are disposed in the first and second grooves 141, 142 of the base 14 respectively, and are hooked into the first and second grooves 141, 142 respectively. The linkage rod 130 is rotated, so that the third and fourth linkage points 133, 134 of the linkage rod 130 are mechanically connected to the first link point 112 of the first optical module base 11 and the second optical link point 112 of the second optical module base 12 respectively. The first and second optical modules 11a, 12a are positioned and fixed on the first and second optical module bases 11, 12 respectively to complete the assembly of the interpupillary distance adjustment module. The present disclosure can utilize the mechanical connection between the third and fourth linkage points 133, 134 and the first and second linkage points 112, 122 to achieve tight fit design, or the pivot connection between the linkage rod and the shaft to achieves a tight fit design, whereby a damping effect can be produced on the toggle switch 10, so as to prevent the linkage rod 130, the first optical module base 11 or the second optical module base 12 from being accidentally move.

Figure 14:
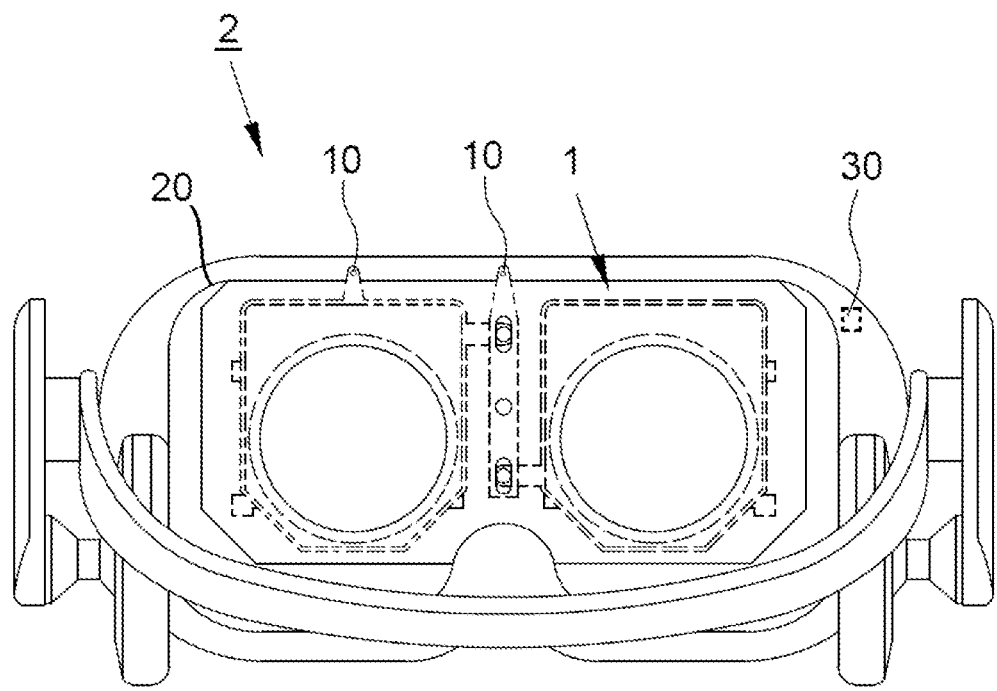
FIG. 14 is a three-dimensional schematic view of a head mounted electronic device according to an embodiment of the present disclosure.

FIG. 14 is a three-dimensional schematic view of a head mounted electronic device according to an embodiment of the present disclosure. The head mounted electronic device 2 includes a shell 20, at least one interpupillary distance adjustment modules 1 of the present disclosure, and a controller 30. The interpupillary distance adjustment module 1 is disposed in the shell 20. The controller 30 is disposed in the shell 20 and electrically connected to the interpupillary distance adjustment module 1. The controller 30 may be a general Processor, a Micro Control Unit (MCU), an Application Processor (AP), a Digital Signal Processor (DSP), a Graphics Processing Unit (GPU) or a Holographic Processing Unit (HPU), or any combination of the above processors, and may include various circuit logics for providing a processing and operation function of data and image and transmitting frame data (such as data for representing character messages, graphs or images) to the image source (such as LCD) of the interpupillary distance adjustment module 1. In this embodiment, the toggle switch 10 is exposed outside the shell 20, whereby when the toggle switch 10 rotates the linkage rod, moves the first optical module base, or moves the second optical module base, the third and fourth linkage points and the first and the second linkage points are simultaneously linked and moved, and then the first optical module located on the first optical module base and the second optical module located on the second optical module base are controlled to be equidistantly close to or far away from each other in the groove direction of the base.

According to the head mounted electronic device of the present disclosure, the interpupillary distance adjustment module of the present disclosure can adjust the interpupillary distance or the width of the eyes by the linkage and movement between the linkage rod and the two optical module bases, for example the distance is adjusted to be between 50 and 80 mm. When the user sets the correct interpupillary distance or eye width, the image quality of the virtual reality (VR) and the augmented reality (AR) can be maximally increased. When the user looks especially through the optical axes of the two optical modules, the best definition and field of view can be achieved.

In view of the above, the foregoing descriptions are merely preferred embodiments of technical means adopted by the present disclosure to solve the problem, but are not intended to limit the scope of the embodiments of the present disclosure. That is, all equivalent changes and modifications made in accordance with the scope of the patent application of the present disclosure or made in accordance with the scope of the patent of the present disclosure fall within the scope of the patent of the present disclosure.

What is claimed is:

1. An interpupillary distance adjustment module comprising:
   a first optical module base comprising a first body, a first slider and a first linkage point, wherein the first slider and the first linkage point are located on a bottom surface and a side surface of the first body respectively;
   a second optical module base comprising a second slider and a second linkage point, wherein the second slider and the second linkage point are located on a bottom surface and aside surface of the second body respectively;
   a linkage mechanism comprising a linkage rod, a third linkage point and a fourth linkage point, wherein the linkage rod has a rotation point, the third and the fourth linkage points are symmetrically disposed at both ends of the rotation point of the linkage rod, and are mechanically connected to the first and second linkage points respectively; and
   a base supporting the first and second optical module base and comprising at least one first groove, at least one second groove and a shaft, wherein the first and second grooves are parallel to each other and define a first groove direction, the rotation point of the linkage rod is pivotally connected to the shaft, and the first and second sliders are disposed in the first and second grooves respectively and move in the first groove direction;
   wherein at least one of the first optical module base, the second optical module base and the linkage rod is provided with a toggle switch, whereby when the toggle switch rotates the linkage rod, moves the first optical module base, or moves the second optical module base, the third and fourth linkage points and the first and second linkage points are simultaneously linked and moved, and then the first and second optical module bases are controlled to be equidistantly close to or far away from each other in the first groove direction.

2. The interpupillary distance adjustment module according to claim 1, further comprising: a first optical module and a second optical module positioned and fixed on the first and second optical module bases respectively, wherein the distance between an optical axis of the first optical module and an optical axis of the second optical module is between 50 and 80 mm.

3. The interpupillary distance adjustment module according to claim 1, wherein the first and second sliders are one of claws and screws.

4. The interpupillary distance adjustment module according to claim 3, wherein when the first and second sliders are claws, the first and second sliders are integrally formed with the first and second bodies respectively; and, when the first and second sliders are screws, the first and second sliders are locked to the first and second bodies respectively.

5. The interpupillary distance adjustment module according to claim 1, wherein when the number of the first groove is one and the number of the second groove is one, the first and second sliders respectively comprise an end portion of a T-shaped section, which are hooked in the first and second grooves respectively.

6. The interpupillary distance adjustment module according to claim 1, wherein when the number of the first groove is at least two and the number of the second groove is at least two, the first and second sliders respectively comprise an end portion of an L-shaped section or an end portion of a T-shaped section, which are hooked in the first and second grooves respectively.

7. The interpupillary distance adjustment module according to claim 1, wherein when the number of the first groove is at least three and the number of the second groove is at least three, the adjacent two of the first and second grooves are disposed in a staggered arrangement.

8. The interpupillary distance adjustment module according to claim 1, wherein the third and fourth linkage points are mechanically connected to the first and second linkage points respectively, which means that the first and second linkage points respectively comprise first and second cylindrical sliders, and the third the fourth linkage point respectively comprise first and second elongated grooves, the first and second cylindrical sliders are disposed in the first and second elongated grooves, and the first and second elongated grooves defines a second groove direction parallel to an axial direction of the linkage rod, wherein when the toggle switch rotates the linkage rod, moves the first optical module base, or moves the second optical module base, the first and second cylindrical sliders move not only in the first groove direction but also in the second groove direction.

9. The interpupillary distance adjustment module according to claim 1, wherein the mechanical connection between the third and the fourth linkage points and the first and the second linkage points is configured to form a tight fit design, thereby producing a damping effect on the toggle switch.

10. The interpupillary distance adjustment module according to claim 1, wherein the pivot connection between the linkage rod and the shaft is configured to form a tight fit design, thereby producing a damping effect on the toggle switch.

11. A head mounted electronic device, comprising:
    a shell;
    an interpupillary distance adjustment module disposed in the shell; and
    a controller disposed in the shell; wherein the interpupillary distance adjustment module comprises:
    a first optical module base comprising a first body, a first slider and a first linkage point, wherein the first slider and the first linkage point are located on a bottom surface and a side surface of the first body respectively;
    a second optical module base comprising a second slider and a second linkage point, wherein the second slider and the second linkage point are located on a bottom surface and a side surface of the second body respectively;
    a linkage mechanism comprising a linkage rod, a third linkage point and a fourth linkage point, wherein the linkage rod has a rotation point, the third and the fourth linkage points are symmetrically disposed at both ends of the rotation point of the linkage rod, and are mechanically connected to the first and second linkage points respectively; and a base supporting the first and second optical module base and comprising at least one first groove, at least one second groove and a shaft, wherein the first and second grooves are parallel to each other and define a first groove direction, the rotation point of the linkage rod is pivotally connected to the shaft, and the first and second sliders are disposed in the first and second grooves respectively and move in the first groove direction;

wherein at least one of the first optical module base, the second optical module base and the linkage rod is provided with a toggle switch, and the toggle switch is exposed outside the shell, whereby when the toggle switch rotates the linkage rod, moves the first optical module base, or moves the second optical module base, the third and fourth linkage points and the first and second linkage points are simultaneously linked and moved, and then the first and second optical module bases are controlled to be equidistantly close to or far away from each other in the first groove direction.

12. The head mounted electronic device according to claim 11, further comprising: a first optical module and a second optical module positioned and fixed on the first and second optical module bases respectively, wherein the distance between an optical axis of the first optical module and an optical axis of the second optical module is between 50 and 80 mm.

13. The head mounted electronic device according to claim 11, wherein the first and second sliders are one of claws and screws.

14. The head mounted electronic device according to claim 13, wherein when the first and second sliders are claws, the first and second sliders are integrally formed with the first and second bodies respectively; and, when the first and second sliders are screws, the first and second sliders are locked to the first and second bodies respectively.

15. The head mounted electronic device according to claim 11, wherein when the number of the first groove is one and the number of the second groove is one, the first and second sliders respectively comprise an end portion of a T-shaped section, which are hooked in the first and second grooves respectively.

16. The head mounted electronic device according to claim 11, wherein when the number of the first groove is at least two and the number of the second groove is at least two, the first and second sliders respectively comprise an end portion of an L-shaped section or an end portion of a T-shaped section, which are hooked in the first and second grooves respectively.

17. The head mounted electronic device according to claim 11, wherein when the number of the first groove is at least three and the number of the second groove is at least three, the adjacent two of the first and second grooves are disposed in a staggered arrangement.

18. The head mounted electronic device according to claim 11, wherein the third and fourth linkage points are mechanically connected to the first and second linkage points respectively, which means that the first and second linkage points respectively comprise first and second cylindrical sliders, and the third the fourth linkage point respectively comprise first and second elongated grooves, the first and second cylindrical sliders are disposed in the first and second elongated grooves, and the first and second elongated grooves defines a second groove direction parallel to an axial direction of the linkage rod, wherein when the toggle switch rotates the linkage rod, moves the first optical module base, or moves the second optical module base, the first and second cylindrical sliders move not only in the first direction groove but also in the second groove direction.

19. The head mounted electronic device according to claim 11, wherein the mechanical connection between the third and the fourth linkage points and the first and the second linkage points is configured to form a tight fit design, thereby producing a damping effect on the toggle switch.

20. The head mounted electronic device according to claim 11, wherein the pivot connection between the linkage rod and the shaft is configured to form a tight fit design, thereby producing a damping effect on the toggle switch.

* * * * *